(12) United States Patent
Brockhaus

(10) Patent No.: US 7,162,651 B2
(45) Date of Patent: Jan. 9, 2007

(54) ELECTRIC DEVICE AND METHOD FOR OPERATING AN ELECTRIC DEVICE

(75) Inventor: Helmut Brockhaus, Dinslaken (DE)

(73) Assignee: Krohne Messtechnik GmbH & Co. KG, Duisburg (DE)

( * ) Notice: Subject to any disclaimer, the term of this patent is extended or adjusted under 35 U.S.C. 154(b) by 483 days.

(21) Appl. No.: 10/713,593

(22) Filed: Nov. 14, 2003

(65) Prior Publication Data

US 2004/0117675 A1 Jun. 17, 2004

(30) Foreign Application Priority Data

Dec. 3, 2002 (DE) ............... 102 56 623

(51) Int. Cl.
*G06F 1/26* (2006.01)
*G06F 1/32* (2006.01)

(52) U.S. Cl. ...................... 713/300; 713/320
(58) Field of Classification Search ...................... None
See application file for complete search history.

(56) References Cited

FOREIGN PATENT DOCUMENTS

| | | |
|---|---|---|
| DE | 29917651 U1 | 9/1993 |
| DE | 4209785 C2 | 11/2000 |
| EP | 101528 A1 * | 2/1984 |
| EP | 0101528 | 11/1989 |

OTHER PUBLICATIONS

Information Disclosure Statement, filed Nov. 14, 2003, Applicant's statement regarding DE 29917651, pp. 1-2.*

* cited by examiner

*Primary Examiner*—James K. Trujillo
*Assistant Examiner*—Stefan Stoynov
(74) *Attorney, Agent, or Firm*—Cesari & McKenna, LLP; John F. McKenna

(57) ABSTRACT

An electric device features a two-wire interface which two-wire interface serves to feed electric power to the electric device and also to transmit a signal, with the maximum power drawn via the two-wire interface in normal operation being restricted to a predefined upper limit. The permissible maximum power consumption of the electric device is automatically and temporarily increased beyond the predefined upper limit when the electric device is switched into a special operational function mode. The length of time in which the electric device is in the special operational function mode can thus be reduced.

10 Claims, 3 Drawing Sheets

ELECTRIC DEVICE AND METHOD FOR OPERATING AN ELECTRIC DEVICE

BACKGROUND OF THE INVENTION

1. Field of the Invention

This invention relates to an electric device with a two-wire interface, which duplex-conductor interface serves the dual purpose of feeding electric power to the electric device and transmitting a signal, with the maximum power drawn by the electric device via said two-wire interface during normal operation being restricted to a predefined upper limit. The invention also relates to a method for operating an electric device of that type.

2. Background Information

Electric devices of the type referred to above, featuring a two-wire interface, are also called two-wire devices. Many of these two-wire devices are measuring instruments. In normal operation, as in a routine measuring process, these two-wire instruments usually draw a predefined amount of current. In two-wire devices with an analog power input port, that predefined current is typically in the range from 4 to 20 mA, where in the case of a measuring instrument 4 mA signals the lowest and 20 mA the highest value measured. In some cases, that range is expanded, with a span for instance from 3.8 to 20.5 mA, which assures the reliable detection of a measuring-range overrun for instance during calibration, or the transferability of the dynamics of a measuring signal. Readings outside that range are not interpreted as measured values. Instead, in many cases a value above the upper limit, 22 mA for example, is interpreted as an indication of a defect.

Two-wire devices whose two-wire interface is in the form of a digital bus connector, with the bus (for instance an IEC 61158-2) also serving to feed electric power to the two-wire device, usually draw current at a constant rate of about 10 mA. For two-wire interfaces in the form of an analog power connection as well as for two-wire interfaces in the form of a digital bus connector that feeds power to the two-wire device through the bus, the current for the electric device is provided by an outboard power supply.

Apart from routine operation of the electric device, for instance as a measuring instrument, the electric device must be able to perform from time to time certain special operational functions. Examples of such special operational functions may include software updates, i.e. the downloading, recording and/or programming of new software for the electric device. But other special operational functions may also include calibrating, diagnostic and maintenance processes.

Switching the electric device into any such special functional mode poses a problem insofar as electric devices whose power input connection is an analog two-wire interface cannot continue with their normal operation, such as a measuring process, while they are in the special function mode. Similarly, in electric devices with a two-wire interface in the form of a digital bus connector through which the electric device receives its power, there may be contention with normal operational functions, or at least the functionality of the electric device may be curtailed.

SUMMARY OF THE INVENTION

It is therefore the objective of this invention to minimize the above problem that is associated with the aforementioned special operational functions of electric devices with a two-wire interface.

For the above-described electric device with a two-wire interface, this objective is achieved in that the permissible current consumption of the electric device is automatically and temporarily increased beyond the predefined upper limit when the electric device is switched into a special operational function mode.

Thus, according to the invention, more electric power is available to the electric device while in the special function mode, allowing the processes that are to take place in the special function mode, such as a software update or a recalibration of the electric device, to be completed more rapidly. In other words, the invention permits a reduction of the time needed for the special operational function. Upon completion of the special operational function, the input current returns to the range reserved for normal operation where the maximum power consumption of the electric device is restricted to within a predefined upper limit. Alternatively, according to the invention, it is equally possible to use the extra power that is available in the special function mode not for reducing the time needed for the special operational function, but for running processes in the special function mode that require more power and which that extra power makes possible in the first place.

The degree to which the permissible power consumption of the electric device is automatically and temporarily increased in the special operational function mode can in each case be adapted to specific requirements. For an electric device whose two-wire interface is an analog power connection with a normal current range from 4 to 20 mA, a preferred embodiment of the invention provides for the maximum permissible power consumption of the electric device, while in the special function mode, to be raised to 22 mA. As explained further above, in two-wire devices with an analog power connection, a is reading above the upper limit, for instance a value of 22 mA, often serves as an error signal that may in any event be provided by the power supply. In this case, however, the value that exceeds the upper limit, such as a current level of 22 mA, is not indicative of a malfunction: any such interpretation applies strictly in normal routine operation but not in the special operational function mode.

For an electric device whose two-wire interface is in the form of a digital bus connector, a preferred embodiment of the invention provides for the maximum permissible power consumption of the electric device, while in the special function mode, to be raised to a value that corresponds to the FDE level of the bus electronics. The term FDE (fault disconnection electronics) describes a concept that is widely used in devices adapted to digital bus systems such as the Profibus-PA (IEC 6158-2). To prevent, in the case of a short circuit, a defective device connected to the bus from also causing other devices on the same bus to malfunction, the FDE in the bus device concerned limits the maximum power consumption of that bus device to the specified FDE level. In order to have as much power as possible in the special function mode, the value of the maximum permissible current level is selected to correspond to the FDE value. Generally, that extent of an increase of the maximum permissible power consumption will always be possible since normally the power supply for the bus segment concerned will itself always tolerate such a power boost. In that context, it should be noted that the underlying concept of the invention is equally valid when implemented through an increase of the maximum permissible power consumption to a point below the FDE value. For example, if the normal current value is 10 mA and the FDE value is 15 mA, an increase of the maximum permissible power consumption to 14 mA equally constitutes an implementation of the basic principle of this invention. Of course, an increase to the FDE value of 15 mA will make even more power available.

In principle, an electric device with a two-wire interface in the form of a digital bus connector can discontinue normal operation while in the special function mode. For example, a measuring instrument with a digital bus interface may be designed to stop any measuring process while in the special function mode. However, in a preferred implementation of the invention, an electric device with a two-wire interface in the form of a digital bus connector is so designed that the digital bus connector serves to transmit the signal even while the electric device is in the special operational function mode. This is fundamentally possible simply because digital communication merely involves a modulation of the carrier signal that provides the input power.

Employing the method referred to above for operating an electric device, the aforementioned objective is achieved in that, as the electric device is switched into a special function mode, the permissible power consumption of the electric device is automatically and temporarily increased beyond the predefined upper limit.

Preferred variations of the method according to this invention for operating an electric device correspond in analogous fashion to the above-described preferred embodiments of the electric device itself.

There are numerous specific ways in which, according to the invention, the electric device and the method for operating that electric device can be configured. In that context, attention is invited to the dependent claims and to the following description of a preferred embodiment of the invention with reference to the attached drawings.

DESCRIPTION OF THE PREFERED EMBODIMENTS

Figure 1:
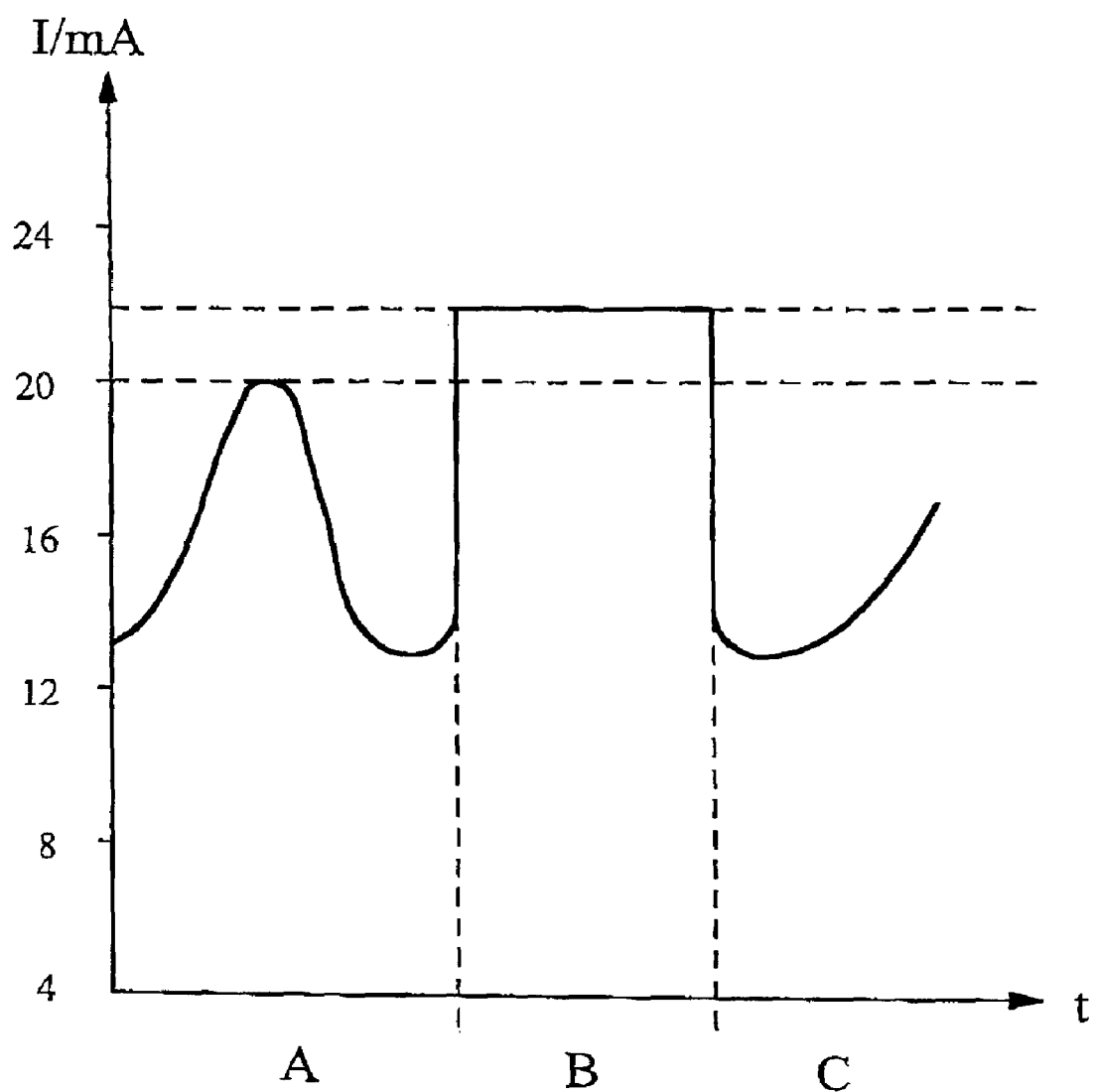
FIG. 1 illustrates schematically the increase of the permissible power consumption of the electric device during a special operational function according to a first preferred embodiment of the invention.

The first preferred embodiment of the invention comprises an electric measuring instrument configured as a two-wire device with an analog power connection through which, during normal measuring operations, flows a current of between 4 and 20 mA. That current serves to power the electric measuring instrument according to the first preferred embodiment of the invention, while also representing the measured value. In the FIG. 1 illustration, normal measuring operation of the measuring instrument according to the first preferred embodiment takes place in time domain A. There, the current changes as a function of time, where the current value can basically fluctuate between 4 and 20 mA, respectively indicating the lowest possible, the highest possible or an intermediate measured value.

The transition from time domain A to time domain B triggers a special operational function, that being a software update for the measuring instrument. In the process, the maximum permissible power consumption of the measuring instrument according to the first preferred implementation of the invention is automatically increased to above the earlier upper limit of 20 mA, to a current level of 22 mA. The measuring instrument according to the first preferred embodiment of the invention thus receives more power during the software update, allowing the software update to be completed quickly. The increase of the maximum permissible power consumption during the software update is of a temporary nature. Following the transition from time domain B to time domain C, which corresponds to the conclusion of the software update, the predefined 20 mA upper limit of the current range applies once again for normal measuring operations.

Figure 2:
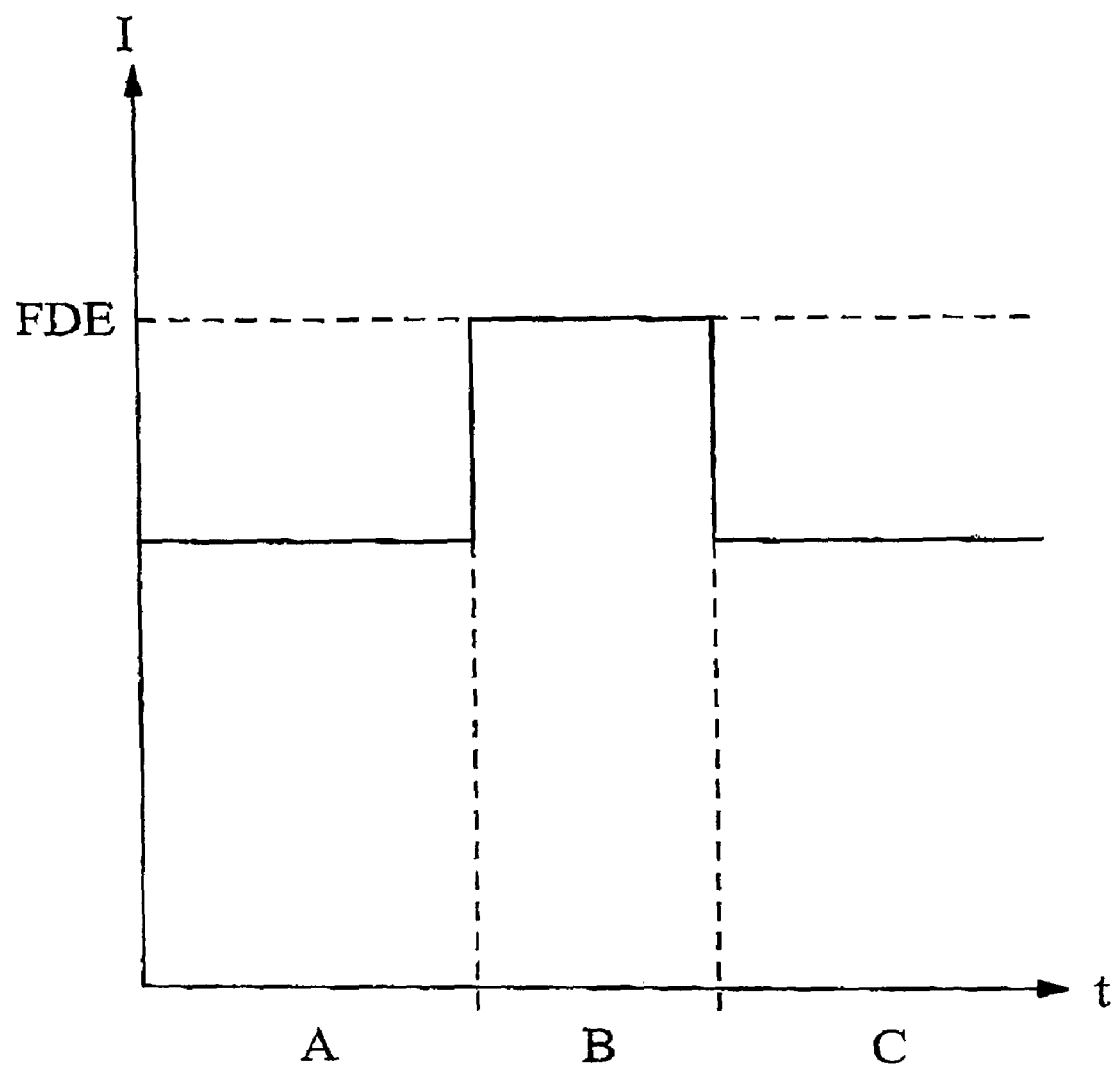
FIG. 2 illustrates schematically the increase of the permissible power consumption of an electric device during a special operational function according to a second preferred embodiment of the invention.

FIG. 2 is a schematic illustration of the operation of such a measuring instrument, in this case equipped with a digital bus interface. During normal measuring operation as reflected in FIG. 2 by time domain A, the measuring instrument according to the second preferred implementation of the invention is powered by a current whose potential, on average, remains constant. That current signal may be modulated for transferring digital functions, not shown in FIG. 2.

As soon as the measuring instrument according to the second preferred embodiment of the invention is switched into a special operational function mode, in this case for a calibration function as marked in FIG. 2 by the transition from time domain A to time domain B, the maximum permissible power consumption is increased to a value that corresponds to the FDE value of the measuring instrument, whereby a maximum power boost is attained.

Concurrently, the measuring operation can be continued since the augmented current signal can be modulated equally for the continued transmission of digital information. As in the first preferred embodiment of the invention described above, the transition from time domain B to time domain C shown in FIG. 2, in this case prompted by the conclusion of the calibration process as the special operational function, causes the maximum permissible power consumption to return to the value for normal operation.

Figure 3:
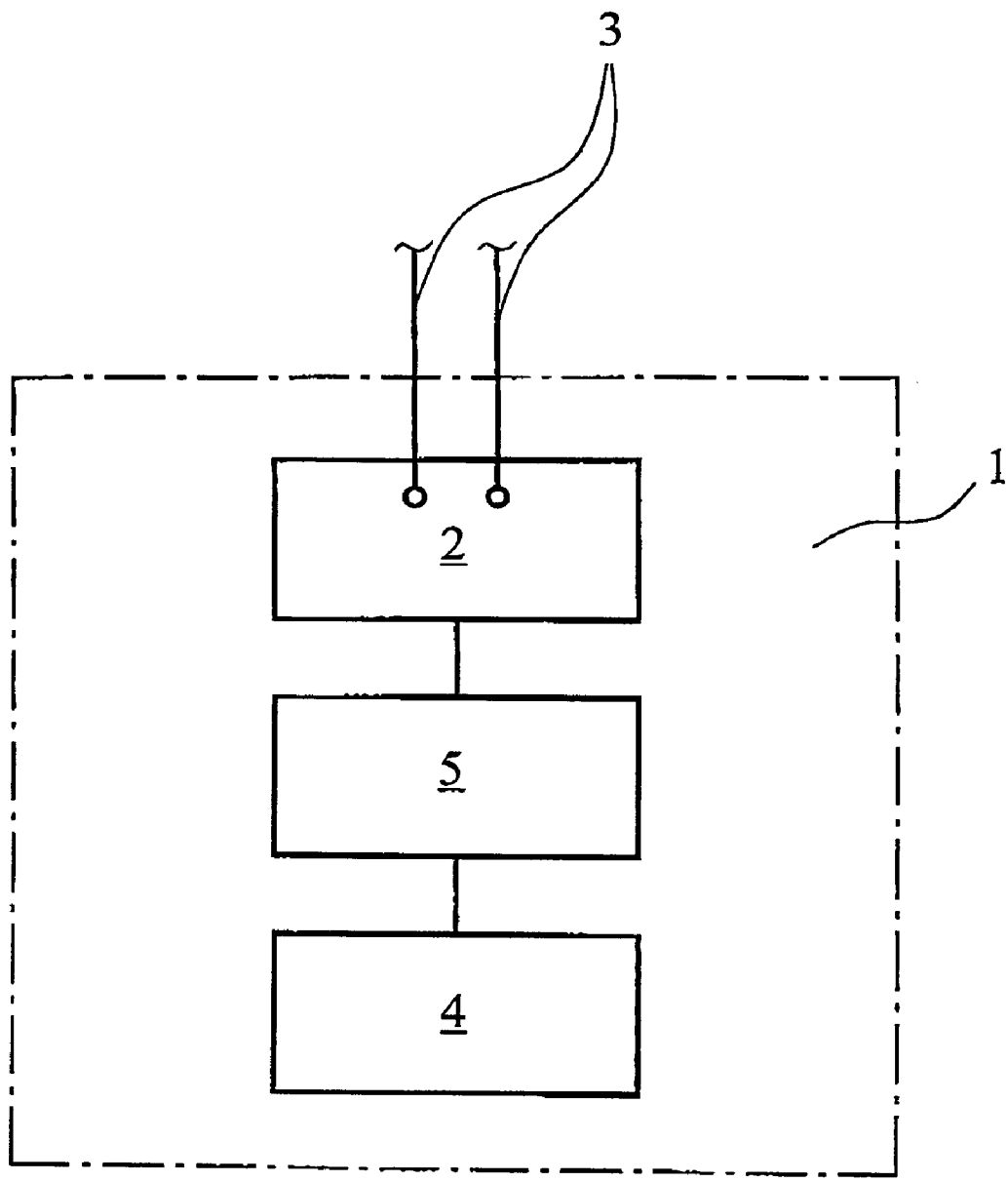
FIG. 3 is a block diagram of an electric device with a digital bus interface operated in accordance with FIG. 2.

In FIG. 3 an electric device 1 according to a preferred embodiment of the invention is shown. The electric device 1 is a measuring device and comprises a two-wire interface 2 in the form of a digital bus interface. This interface 2 is used for delivering electric power to the measuring device 1 and to transmit a measuring signal over a two-wire line 3 connected to the two-wire interface 2. A measuring unit 4 of the measuring device 1 measures the measuring signal. Further, a switching unit 5 is provided in the measuring device 1 in order to automatically and temporarily increase the permissible power consumption of the measuring device 1 by the measuring unit 4 beyond a predefined upper limit that is valid in normal operation mode when the measuring device 1 is switched inot a special operational function mode.

This special operation function mode can be a software update and/or a calibration process and/or a diagnostic function and/or maintenance function or the like. Since the two-wire interface 2 is in the form of a digital bus connector, the measuring signal can still be transmitted when the measuring device 1 is in the special operational function mode.

As a final observation regarding this invention, the following should be stated:

the invention relates to electric devices with at least one two-wire interface. That extends the applicability of the invention to electric devices incorporating multiple two-wire interfaces along the concept discussed above, or at least, in addition to one such two-wire interface, one other, and perhaps different, interface.

Where in this application it says that the permissible power consumption of the electric device is increased beyond the predefined upper limit for normal operation of the electric device, the term "permissible" is not to imply that otherwise the electric device would necessarily become inoperative. Instead, "permissible" refers to a level which for normal operation may be defined by an appropriate standard.

What is claimed is:

1. An electric device with a two-wire interface, said two-wire interface serving to deliver electric power to the electric device and to transmit a signal, with the maximum power consumption of the electric device during normal operation being restricted to a predefined upper limit, wherein the permissible power consumption of the electric device is automatically and temporarily increased beyond said predefined upper limit when the electric device is switched into a special operational function mode whereby more electric power is available to the electric device while in the special operational function mode.

2. The electric device as in claim 1, wherein an operation selected from the group consisting of a software updates, a calibration process, a diagnostic function and a maintenance function and is considered to constitute a special operational function.

3. The electric device as in claim 1 or 2, wherein the two-wire interface consists of an analog power input connection with a normal current range from 4 to 20 mA and in the special operational function mode of the electric device, the maximum permissible power consumption is increased to 22 mA.

4. The electric device as in claim 1 or 2, wherein the two-wire interface is a digital bus connector and in the special operational function mode of the electric device, the maximum permissible power consumption is raised to a value that corresponds to the FDE value of the measuring device.

5. The electric device as in claim 4, wherein the digital bus connector serves to transmit the signal even while in the special operational function mode of the electric device.

6. A method for operating an electric device that incorporates a two-wire interface which two-wire interface serves to feed electric power to the electric device while also transmitting a signal, with the maximum power drawn by the electric device via the two-wire interface during normal operation being restricted to a predefined upper limit, wherein as the electric device is switched into a special operational function mode, the permissible maximum power consumption of the electric device is automatically and temporarily increased beyond the predefined upper limit whereby more electric power is available to the electric device while in the special operational function mode.

7. The method as in claim 6, wherein an operation selected from the group consisting of a software updates, a calibration process, a diagnostic function and a maintenance function is considered to constitute a special operational function.

8. The method as in claim 6 or 7, wherein the two-wire interface consists of an analog power input connection with a normal current range from 4 to 20 mA and in the special operational function mode of the electric device, the maximum permissible power consumption is increased to 22 mA.

9. The method as in claim 6 or 7, wherein the two-wire interface is a digital bus connector and in the special operational function mode of the electric device, the maximum permissible power consumption is raised to a value that corresponds to the FDE value of the measuring device.

10. The method as in claim 9, wherein the digital bus connector serves to transmit the signal even while in the special operational function mode of the electric device. whereby more electric power is available to the electric device while in the special operational function mode.

* * * * *